US008311861B1

(12) United States Patent
Erickson et al.

(10) Patent No.: US 8,311,861 B1
(45) Date of Patent: Nov. 13, 2012

(54) DEVELOPMENT AND MAINTENANCE SYNERGY TRACKER

(75) Inventors: Barbara Erickson, Shawnee, KS (US); Michael Mealman, Lenexa, KS (US); Mathew E. Perkins, Lee's Summit, MO (US)

(73) Assignee: Sprint Communications Company LP, Overland Park, KS (US)

( * ) Notice: Subject to any disclaimer, the term of this patent is extended or adjusted under 35 U.S.C. 154(b) by 1402 days.

(21) Appl. No.: 11/558,019

(22) Filed: Nov. 9, 2006

(51) Int. Cl.
*G06Q 40/00* (2012.01)
(52) U.S. Cl. ............................ 705/7.11; 705/7.35
(58) Field of Classification Search ............ 705/1, 7, 705/9, 11, 7.11, 7.35
See application file for complete search history.

(56) References Cited

U.S. PATENT DOCUMENTS

| | | | | |
|---|---|---|---|---|
| 6,023,702 | A * | 2/2000 | Leisten et al. | 1/1 |
| 7,302,401 | B1 * | 11/2007 | Tervonen | 705/9 |
| 7,752,068 | B1 * | 7/2010 | Micklavzina et al. | 705/10 |
| 2004/0193703 | A1 * | 9/2004 | Loewy et al. | 709/220 |
| 2004/0249657 | A1 * | 12/2004 | Kol et al. | 705/1 |
| 2005/0080892 | A1 * | 4/2005 | Moser et al. | 709/223 |
| 2006/0173726 | A1 * | 8/2006 | Hall et al. | 705/8 |
| 2007/0276674 | A1 * | 11/2007 | Hemmat | 705/1 |
| 2008/0052314 | A1 * | 2/2008 | Batabyal | 707/104.1 |

OTHER PUBLICATIONS

Mili, Rym "Determining the reuse worthiness of a component: Empirical and analytical approaches," 1997, Ph.D. dissertation, University of Ottawa.*
Pitt, W. David. "Measuring Java Reuse, Productivity, and ROI," Jul. 2005, Dr. Dobbs Journal, pp. 16-23.*
Bockle et al. "Calculating ROI for Software Product Lines," May/Jun. 2004, IEEE Software, pp. 23-31.*

* cited by examiner

*Primary Examiner* — Thomas Dixon
*Assistant Examiner* — Benjamin S Fields

(57) ABSTRACT

A method of estimating synergy in a development process is provided. Project hours spent during a baseline time period by an adopted application in support of a phased-out application are estimated. Project hours spent during a subsequent time period by the adopted application in support of the phased-out application are estimated. Estimated project hours spent in the subsequent time period are subtracted from estimated project hours spent in the baseline time period to determine an indirect synergy result. Hours spent in the subsequent time period by the phased-out application are subtracted from hours spent in the baseline time period by the phased-out application to determine a direct synergy result. The direct synergy result is added to the indirect synergy result to create a combined synergy result to display to a development process user.

17 Claims, 5 Drawing Sheets

| Applications 602 | Impact Type 604 | Disposition 606 | Working Group Support 608 | Hours 610 |
|---|---|---|---|---|
| Second Billing Manager Application 312 | Code | Phased-out | Yes | 100 |
| Second Database Application 316 | Code | Phased-out | Yes | 50 |
| Second User Interface Application 318 | Support | Phased-out | Yes | 60 |
| First Billing Manager Application 308 | Code | Adopted | Yes | 150 |
| First Database Application 314 | Code | Adopted | No | 30 |
| First User Interface Application 310 | Support | Adopted | Yes | 80 |
| Working Group Application 320 | Test | Adopted | Yes | 75 |

FIG. 6

| Project 702 | Phased-out Application 704 | Phased-out Code Hours 706 | Project Code Hours 708 | Working Group Hours 710 | Phased-out Hours Percentage 712 | Estimated Adopted Application Support Hours 714 |
|---|---|---|---|---|---|---|
| First Project 302 | Second Billing Manager Application 312 | 100 | 300 | 75 | 33.3% | 25 |

FIG. 7

| Projects 802 | Phased-out Application 804 | Estimated Hours to Phased-out Application 806 | Estimated Future Hours to Phased-out Application 808 |
|---|---|---|---|
| First Project 302 | Second Billing Manager Application 312 | 25 | 20 |
| Fourth Project 810 | Second Billing Manager Application 312 | 20 | 15 |

FIG. 8

| Category 902 | Adopted Application 904 | Phased-out Application 906 | Estimated Hours 908 | Estimated Future Hours 910 |
|---|---|---|---|---|
| Baseline 912 | Working Group Application 320 | Second Billing Manager Application 312 | 22 | 24 |
| Subsequent 914 | Working Group Application 320 | Second Billing Manager Application 312 | 25 | 20 |
| Delta 916 | Working Group Application 320 | Second Billing Manager Application 312 | +3 | -4 |

FIG. 9

DEVELOPMENT AND MAINTENANCE SYNERGY TRACKER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Merging enterprises often seek to realize savings and gain efficiencies of scale by phasing out redundant systems, projects, and applications. An application is computer software that employs the capabilities of a computer to perform a task for a computer user, and a project may be a temporary endeavor undertaken to create a unique product or service. Similarly, redundant systems, projects, or applications in a large enterprise are phased out even in the absence of merger activity. For example, a project manager decides to adopt only a first database application for further development, and decides to phase out a second database application, a redundant database application. Any enterprise can realize savings of development time and maintenance effort associated with the eliminated systems, projects, and applications. Such savings, or "direct synergies," alone can justify the elimination of such redundancies. However, often there is additional hidden savings, "indirect" synergies that should be identified and taken into account when making such decisions or reporting the results of such decisions.

SUMMARY

Disclosed herein are various systems and methods for tracking development and maintenance synergies. In one method embodiment, project hours spent during a baseline time period by an adopted application in support of a non-adopted application are estimated. Project hours spent during a subsequent time period by the adopted application in support of the non-adopted application are estimated. Estimated project hours spent in the subsequent time period are subtracted from estimated project hours spent in the baseline time period to determine an indirect synergy result. Hours spent in the subsequent time period by the non-adopted application are subtracted from hours spent in the baseline time period by the non-adopted application to determine a direct synergy result. The direct synergy result is added to the indirect synergy result to create a combined synergy result to display to a development process user.

A system embodiment includes a data manager and a memory. The data manager estimates project hours spent during a baseline time period by an adopted application in support of a non-adopted application and project hours spent during a subsequent time period by the adopted application in support of the non-adopted application. Then the data manager subtracts estimated project hours spent in the subsequent time period from estimated project hours spent in the baseline time period to determine an indirect synergy result. Next, the data manager subtracts hours spent in the subsequent time period by the non-adopted application from hours spent in the baseline time period by the non-adopted application to determine a direct synergy result. After that, the data manager adds the direct synergy result to the indirect synergy result to create a combined synergy result to store in the memory.

In yet another embodiment, a method of estimating synergy in a development process is provided. Project hours for a baseline time period by an adopted application in support of a non-adopted application are estimated. Future project hours for a subsequent time period for the adopted application in support of the non-adopted application are estimated. Estimated future project hours for the subsequent time period are subtracted from estimated project hours for the baseline time period to determine a future indirect synergy result. Future hours for the subsequent time period by the non-adopted application are subtracted from hours for the baseline time period by the non-adopted application to determine a future direct synergy result. The future direct synergy result is added to the future indirect synergy result to create a future combined synergy result to display to a development process user.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 6 shows an illustrative project table for a development and maintenance synergy tracker according to an embodiment of the present disclosure.

FIG. 7 shows an illustrative hours estimation table for a development and maintenance synergy tracker according to an embodiment of the present disclosure.

FIG. 8 shows an illustrative non-adopted application table for a development and maintenance synergy tracker according to an embodiment of the present disclosure.

FIG. 9 shows an illustrative indirect synergy table for a development and maintenance synergy tracker according to an embodiment of the present disclosure.

DETAILED DESCRIPTION

Figure 1:
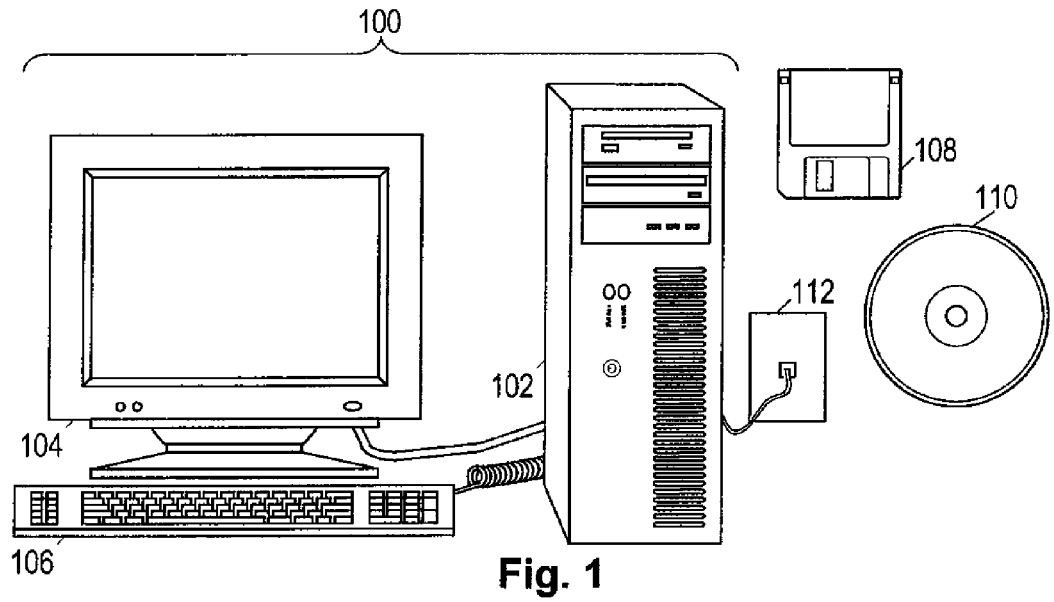
FIG. 1 shows an illustrative development and maintenance synergy tracker embodied as a desktop computer.

It should be understood at the outset that although implementations of various embodiments of the present disclosure are described below, the present system may be implemented using any number of techniques, whether currently known or in existence. The present disclosure should in no way be limited to the implementations, drawings, and techniques described below, but may be modified within the scope of the appended claims along with their full scope of equivalents.

In embodiments of the present disclosure, methods and systems of estimating synergy in a development and maintenance process are provided. A system, project, or application that is redundant for another system, project, or application can be phased out, which can result in greater savings than the time and effort saved by simply not developing the phased-out project application. That is, some phased-out projects required resources from various supporting systems, and the reduced demand should also be identified as a synergy. For example, when an application under development is phased out, or non-adopted, a test application that tests applications under development saves time and effort by reducing or eliminating the time and effort spent testing the phased-out application. Data management applications and project management applications are additional examples of adopted applications that supported phased-out applications. The time and effort saved by reducing or eliminating the support of phased-out applications constitute hidden savings from phasing out redundant systems, projects, and applications, indirect synergies that combine with direct synergies to justify elimination of such redundancies. A review of the estimated synergies can change decisions about which applications are selected to be phased-out and whether enough applications are selected to be phased-out.

In embodiments of the present disclosure, a synergy tracker estimates hours spent by an adopted application supporting a phased-out project application during a baseline time period and a subsequent time period. The synergy tracker estimates the project hours spent by the adopted application supporting the phased-out project application according to the equation:

$$TP=(T \times P)/A$$

where TP=the project hours spent by the adopted application, such as a test application, supporting the phased-out project application, T=project hours spent on the adopted application, such as a test application, P=the project hours spent on the phased-out project application, and A=project hours spent on all supported applications.

The ratio of project hours spent on the phased-out project application to the project hours spent on all applications provides an estimate of the percentage of time spent by the adopted application supporting the phased-out project application. The synergy tracker determines the indirect synergy result according to the equation:

$$IS=B_I-S_I$$

where IS=the indirect synergy result, $B_I$=from the estimated project hours spent in the baseline time period, and $S_I$=estimated project hours spent in the subsequent time period.

The synergy tracker determines the direct synergy result according to the equation:

$$DS=B_D-S_D$$

where DS=the direct synergy result, $B_D$=project hours spent in the baseline time period by the phased-out project application, and $S_D$=project hours spent in the subsequent time period by the phased-out project application.

The synergy tracker determines the combined synergy result according to the equation:

$$CS=IS+DS$$

where CS=the combined synergy result.

The synergy tracker displays the combined synergy result to a development process user or stores the combined synergy result in a memory. In some embodiments of the present disclosure, the synergy tracker estimates future synergy results.

FIG. 1 shows an illustrative system 100 for implementing a development and maintenance synergy tracker. The system 100 is shown as a desktop computer 100, although any electronic device having some amount of computing power coupled to a user interface may be configured to carry out the methods disclosed herein. Among other things, servers, portable computers, personal digital assistants (PDAs) and mobile phones may be configured to carry out aspects of the disclosed management tool methods.

As shown, the system 100 comprises a chassis 102, a display 104, and an input device 106. The chassis 102 comprises a processor, memory, and information storage devices. One or more of the information storage devices may store programs and data on removable storage media such as a floppy disk 108 or an optical disc 110. The chassis 102 may further comprise a network interface that allows the system 100 to receive information via a wired or wireless network, represented in FIG. 1 by a phone jack 112.

The chassis 102 is coupled to the display 104 and the input device 106 to interact with a user of a development and maintenance synergy tracker system. The display 104 and the input device 106 may together operate as a user interface. The display 104 is shown as a video monitor, but may take many alternative forms such as a printer, a speaker, or other means for communicating information to a user, information such as estimated direct and indirect synergies. The input device 106 is shown as a keyboard, but may similarly take many alternative forms such as a button, a mouse, a keypad, a dial, a motion sensor, a camera, a microphone or other means for receiving information from a user, information such as project hour/resource allocations that serve as the basis for synergy calculations. Both the display 104 and the input device 106 may be integrated into the chassis 102.

Figure 2:
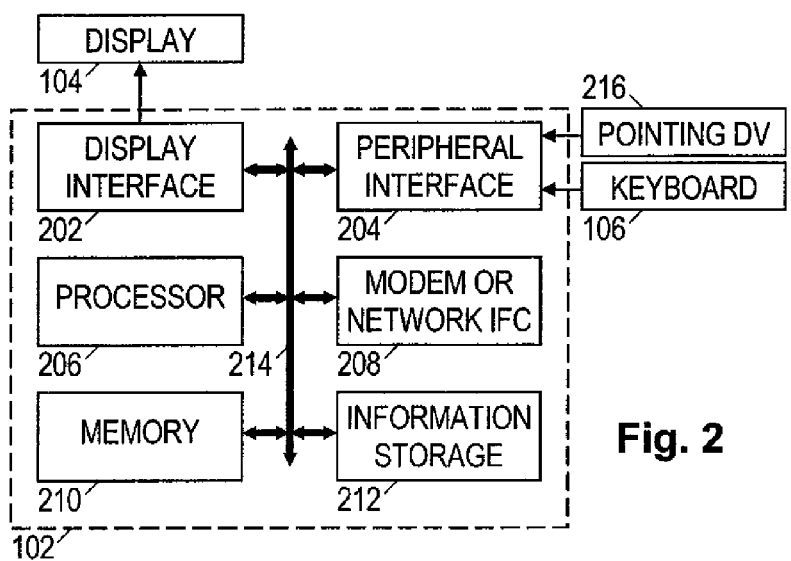
FIG. 2 shows a block diagram of an illustrative development and maintenance synergy tracker system.

FIG. 2 shows a simplified functional block diagram of the system 100. The chassis 102 may comprise a display interface 202, a peripheral interface 204, a processor 206, a modem or other suitable network interface 208, a memory 210, an information storage device 212, and a bus 214. The system 100 may be a bus-based computer, with the bus 214 interconnecting the other elements and carrying communications between them. The display interface 202 may take the form of a video card or other suitable display interface that accepts information from the bus 214 and transforms it into a form suitable for the display 104. Conversely, the peripheral interface 204 may accept signals from the keyboard 106 and other input devices such as a pointing device 216, and transform them into a form suitable for communication on the bus 214.

The processor 206 gathers information from other system elements, including input data from the peripheral interface 204, and program instructions and other data from the memory 210, the information storage device 212, or from a remote location via the network interface 208. The processor 206 carries out the program instructions and processes the data accordingly. The program instructions may further configure the processor 206 to send data to other system elements, comprising information for the user which may be communicated via the display interface 202 and the display 104, information such as estimated direct and indirect synergies.

The network interface 208 enables the processor 206 to communicate with remote systems via a network. The memory 210 may serve as a low-latency temporary store of information for the processor 206, and the information storage device 212 may serve as a long term (but higher latency) store of information, including information such as estimated direct and indirect synergies.

The processor 206, and hence the desktop computer 100 as a whole, operates in accordance with one or more programs stored on the information storage device 212. The processor 206 may copy portions of the programs into the memory 210 for faster access, and may switch between programs or carry out additional programs in response to user actuation of the input device. The additional programs may be retrieved from the information storage device 212 or may be retrieved from remote locations via the network interface 208. One or more of these programs configures the system 100 to carry out at least one of the development and maintenance synergy tracker methods disclosed herein.

Figure 3:
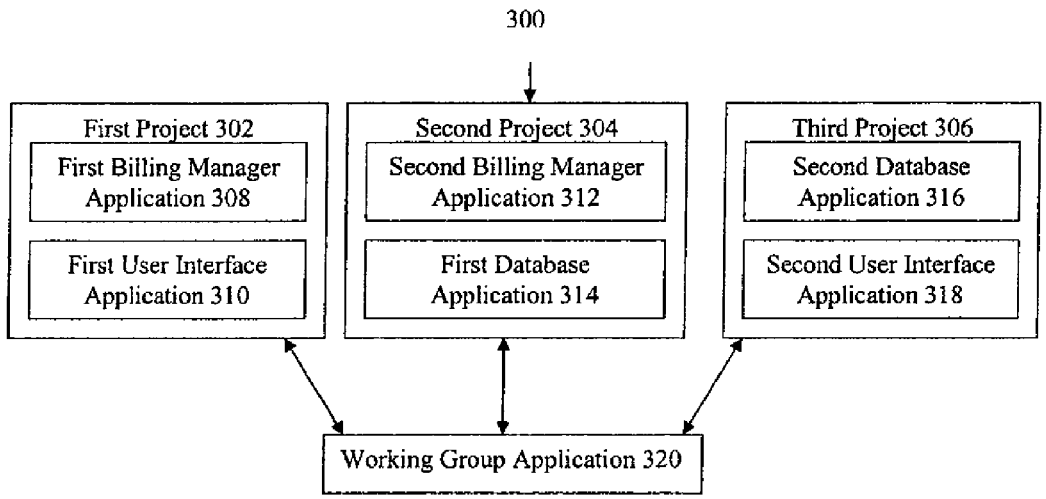
FIG. 3 shows a block diagram of projects and applications.

Turning now to FIG. 3, a block diagram 300 of projects and applications is depicted. The diagram 300 shows a first project 302, a second project 304, and a third project 306. The first project 302 shown includes a first billing manager application 308 and a first user interface application 310. The second project 304 includes a second billing manager application 312 and a first database application 314. The third project 306 includes a second database application 316 and a second user interface application 318. These projects and applications are depicted for the purpose of an illustrative example only, as an organization can have any number of projects and applications. The diagram 300 also includes a working group application 320, an application that supports the applications in the first project 302, the second project 304, and the third project 306 by testing the applications for each project. The working group application can be a testing application, a data management application, or a project management application. The projects 302-306 are projects for business enterprises that merged or projects for a single business enterprise that is seeking to eliminate redundancy.

Figure 4:
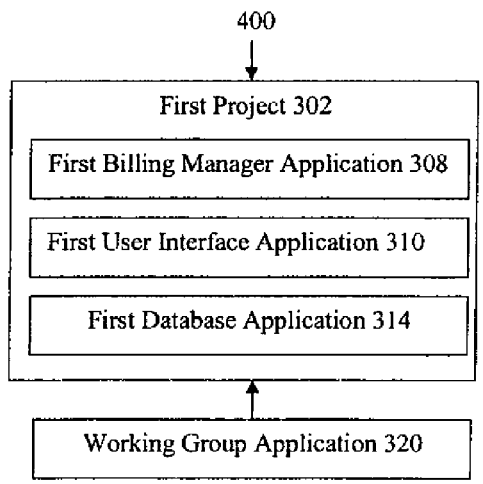
FIG. 4 shows a block diagram of a resulting project and applications.

Turning now to FIG. 4, a block diagram 400 of a resulting project and applications is depicted. The diagram 400 depicts the first project 302, which still includes the first billing manager application 308 and the first user interface application 310, as depicted in FIG. 3. However, the first project 302 also includes the first database application 314, originally supported by the second project 304.

For example, an enterprise that results from a merger or an enterprise that combines projects adopts the first database application 314 from the second project 304, but does not adopt the second billing manager application 312 from the second project 304. The enterprise declines adoption of the second billing manager application 312 because the goals and the functions for the second billing manager application 312 are the same as or sufficiently redundant for the goals and the functions of the first billing manager application 308 from the first project 302. Additionally, the enterprise declines to adopt either the second database application 316 or the second user interface application 318, both from the third project 306. The enterprise decides not to adopt the second database application 316 and the second user interface 318 because the goals and the functions for the second database application 316 and the second user interface 318 are the same as or sufficiently redundant for the goals and the functions of the first database application 314 from the second project 304 and the first user interface application 310 from the first project 302, respectively.

A result from either an enterprise merger or a combination of projects can be the adoption of all applications from the first project 302, the adoption of the first database application 314 from the second project 304, the non-adoption of the second billing manager application 312 from the second project 304, and the non-adoption of all applications of the third project 306. Therefore, beyond the adoption by the first project 302 of the first database application 314, originally supported by the second project 304, neither the second project 304 nor the third project 306 is further developed. Although the second billing manager application 312 for the second project 304 is not adopted, the second billing manager application 312 impacts the first project 302 because the goals and the functions for the second billing manager application 312 are the same as or sufficiently redundant for the goals and the functions of the first billing manager application 308 from the first project 302. These projects and applications are depicted for the purpose of an illustrative example only, as the diagram 400 can include any combination of projects and applications.

Figure 5:
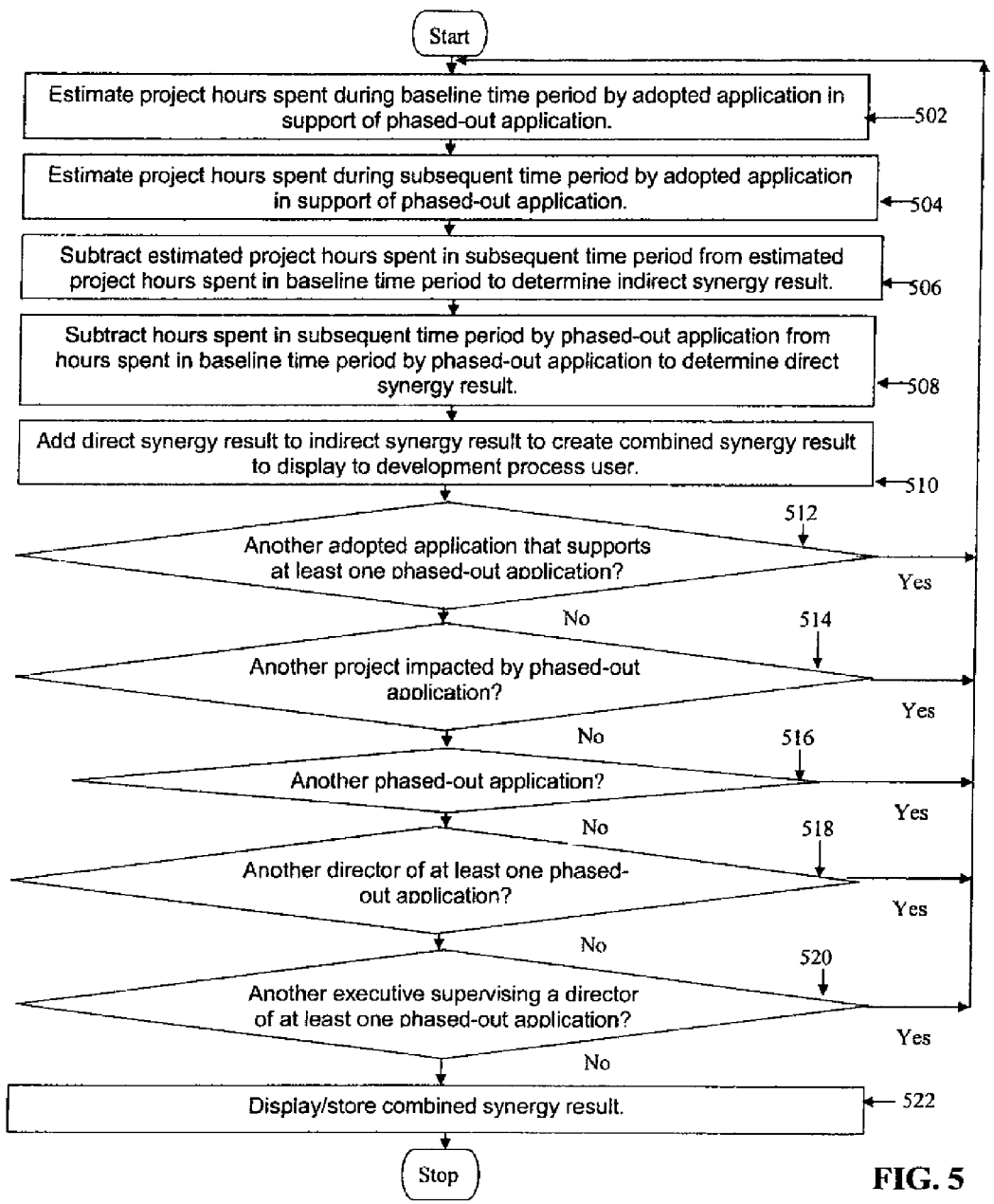
FIG. 5 shows an illustrative synergy tracker method according to an embodiment of the present disclosure.

Turning now to FIG. 5, an illustrative synergy tracker method is depicted according to some embodiments of the present disclosure. The synergy tracker method enables a user to track the indirect synergy result and the direct synergy result for each phased-out application supported by each adopted application, or application selected for further development, for each project. The synergy tracker method also applies to non-adopted applications and any projects associated with the non-adopted application, such as recurring and non-recurring projects.

In box 502, a data manager, or synergy tracker, estimates project hours spent during a baseline time period by an adopted application in support of a phased-out application. An application can be phased out gradually, rather than simply eliminated, to permit further support of applications to insure that the goals and functions of the phased-out application are fully developed by a corresponding application that is developed, or adopted. For example, the baseline time period is the month of January during the previous year, the adopted application is the working group application 320 that tests other applications, and the first database application 314 and the second database application 316 are applications for different projects that were tested by the working group application 320 during January of the previous year, as depicted in FIG. 3 and FIG. 4. A project manager decides to adopt only the first database application 314 for further development, and phases out the second database application 316, which is a redundant database application. Additionally, the project manager decides to adopt the working group application 320 for further maintenance use.

In this example, the working group application 320 is described as the specific application that supported a phased-out application, the second database application 316, during the baseline period. However, the synergy tracker method can also estimate synergy based on the operation of a first working group application for a first enterprise which replaces the support of a second working group application that actually supported a phased-out application for a second enterprise that has merged with the first enterprise.

For example, the synergy tracker estimates the project hours spent during January of the previous year by the working group application 320 in support of the second database application 316. The synergy tracker estimates the project hours spent by the working group application 320 supporting the phased-out second database application 316 according to the equation:

$$TP=(T \times P)/A$$

where TP=the project hours spent by the working group application 320 supporting the phased-out second database application 316, T=project hours spent on the working group application 320, P=the project hours spent on the phased-out second database application 316, and A=project hours spent on all supported applications.

In this example, not all project applications are supported project applications, because a test application tests only project applications that have an impact on code, project applications with an impact type of "code." Project applications that do not impact code are not tested by a testing application.

For example, if the first project 302 spent 75 hours on the second database application 316 during January of the previous year, and the first project 302 spent 250 hours on all of the applications supported during January of the previous year, then the first project 302 spent 30 percent of all the application hours on the second database application 316 during January of the previous year. If the first project 302 spent 80 hours during January of the previous year on the working group application 320 supporting applications for the first project 302, then the estimated project hours spent during January of the previous year by the working group application 320 supporting the second database application 316 equals 30 percent of the 80 hours spent on the working group application 320, or 24 hours.

In box 504, the synergy tracker estimates project hours spent during a subsequent time period by the adopted application in support of the phased-out application. For example, the subsequent time period is January of the current year. Alternatively, the subsequent time period is a time period in the future, such as the month of December of the current year, and the estimation is based on project hours forecast by project managers, rather than hours already spent by the project. The synergy tracker estimates the project hours spent during January of the current year by the working group application 320 in support of the second database application 316 according to the equation:

$$TP=(T \times P)/A$$

The first project 302 spends hours maintaining the phased-out second database application 316 to permit further support of the first database application 314 and the second database application 316 to insure that the goals and functions of the phased-out second database application 316 are fully developed by the corresponding adopted first database application 314.

For example, if the first project 302 spent 50 hours on the second database application 316 during January of the current year, and the first project 302 spent 250 hours on all of the applications supported during January of the current year, then the first project 302 spent 20 percent of all the application hours on the second database application 316 during January of the current year. If the first project 302 spent 80 hours during January of the current year on the working group application 320 supporting applications for the first project 302, then the estimated project hours spent during January of the current year by the working group application 320 supporting the second database application 316 equals 20 percent of the 80 hours spent on the working group application 320, or 16 hours.

In box 506, the synergy tracker determines the indirect synergy result according to the equation:

$$IS=B_I-S_I$$

For example, the estimated project hours spent during January of the current year by the working group application 320 supporting the second database application 316 equals 16 hours and the estimated project hours spent during January of the previous year by the working group application 320 supporting the second database application 316 equals 24 hours. Therefore, the synergy tracker subtracts 16 hours from 24 hours to determine that the indirect synergy result equals 8 hours for January of the current year. The indirect synergy result of 8 hours indicates that the working group application 320 spent 8 less hours this January than last January supporting the second database application 316, a hidden maintenance savings beyond the development savings from phasing out the redundant second database application 316.

In box 508, the synergy tracker determines the direct synergy result according to the equation:

$$DS=B_D-S_D$$

For example, the first project 302 spent 50 hours on the second database application 316 during January of the current year and the first project 302 spent 75 hours on the second database application 316 during January of the previous year. The first project 316 spends hours developing the phased-out second database application 316 to permit further support of the first database application 314 and the second database application 316 to insure that the goals and functions of the phased-out second database application 316 are fully developed by the corresponding adopted first database application 314. The synergy tracker subtracts 50 hours from 75 hours to determine that the direct synergy result equals 25 hours for January of the current year. The 25 hours measure the direct synergy savings, the development savings from phasing out the redundant second database application 316.

In box 510, the synergy tracker determines the combined synergy result according to the equation:

$$CS=IS+DS$$

For example, the synergy tracker adds the direct synergy result of 25 hours to the indirect synergy result of 8 hours to determine the combined synergy result of 33 hours of savings by the first project 302 for the second database application 316 during January of the current year, which the synergy tracker displays to the development process user or stores in a memory.

In box 512, the synergy tracker determines whether the combined synergy result is estimated for each adopted application that supports at least one phased-out application. For example, if the combined synergy result is estimated for each adopted application that supports at least one phased-out application, the synergy tracker proceeds to execute box 514. In another example, if additional applications, such as applications other than the working group application 320, supported phased-out applications during the time period, then the synergy tracker executes boxes 502 to 510 for each of the additional applications that supported phased-out applications.

In box 514, the synergy tracker determines whether the combined synergy result is estimated for each project impacted by the phased-out application. For example, if the combined synergy result is estimated for each project impacted by the phased-out application, the synergy tracker proceeds to execute box 516. Multiple projects may have been developing different aspects of the phased-out second database application 316 during the previous year, and many of these projects may have supported the phased-out second database application 316 by supporting the second database application 316 during the previous year. In another example, if the second database application 316 was an application supported by multiple projects during the time period, then the synergy tracker executes boxes 502 to 512 for each of the projects that supported the second database application.

In box 516, the synergy tracker determines whether the combined synergy result is estimated for each phased-out application. For example, if the synergy tracker determines the combined synergy result is estimated for each phased-out application, the synergy tracker proceeds to execute box 518. In another example, if the second database application 316 was an application supported by multiple projects or supported by multiple adopted working group applications during the previous year, then the synergy tracker executes boxes 502 to 514 to combines the synergy results of each supporting project and each supporting adopted application for the second database application.

In box 518, the synergy tracker determines whether a combined synergy result is estimated for each director of at least one phased-out application. In some embodiments, each project is directed by a project director, such that each project director directs many projects impacted by phased-out applications. For example, if the synergy tracker determines a combined synergy result is estimated for each director of at least one phased-out application, the synergy tracker proceeds to execute box 520. In another example, if combined synergy results are not estimated for additional directors of at least one phased-out application, the synergy tracker executes boxes 502 to 516 to determine the combined synergy result for each of the phased-out applications for each impacted project for each project director. Therefore, in some embodiments the synergy tracker provides a combined synergy result for each project director based on all of the projects that the project director directs. Alternatively, the synergy tracker groups synergy results for various projects according to a project category, rather than grouped by project director. For example, the synergy tracker groups synergy results for all database applications in one group, and groups the synergy results for all billing applications in another group.

In box 520, the synergy tracker determines whether a combined synergy result is estimated for each executive supervising each director of at least one phased-out application. For example, if the synergy tracker determines that a combined synergy result is estimated for each executive supervising each director of at least one phased-out application, the synergy tracker proceeds to execute box 522. Each project director is supervised by an executive, such that each executive supervises many project directors that direct many projects impacted by phased-out applications. In another example, if combined synergy results are not estimated for additional executives supervising a director of at least one phased-out application, the synergy tracker executes boxes 502 to 518 to determine the combined synergy result for each of the phased-out applications for each impacted project for each project director for each executive. Therefore, the synergy tracker provides a combined synergy result for each executive based on all of the directors that the executive supervises. Alternatively, the synergy tracker groups synergy results for various projects according to an employee category, rather than grouped by the executive supervising each project. For example, the synergy tracker groups synergy results for all employee-generated applications in one group, and groups the synergy results for all outsourced applications in another group.

In box 522, the synergy tracker displays or stores the combined synergy result. The synergy tracker displays the combined synergy result to a development process user or stores the combined synergy result in a memory.

Optionally, the synergy tracker converts the combined synergy result from hours saved to money saved. For example, an enterprise estimates development and maintenance expenses at 60 dollars per hour. For this example, the synergy tracker multiplies each combined synergy result hour by 60 to convert the hours saved to dollars saved.

Turning now to FIG. 6, an illustrative project table 600 for a development and maintenance synergy tracker is depicted according to an embodiment of the present disclosure. The project table 600 provides the user of a synergy tracker with an overview of a project, the applications for the project, and the applications that impact the project, such as the first project 302 in FIG. 4. The project table 600 enables a user to understand the basis for executing box 502 or box 504 in FIG. 5. The project table 600 includes columns for applications 602, impact type 604, disposition 606, working group support 608, and hours 610. The applications 602 column includes rows for both adopted applications and phased-out applications that impact a specific project, such as the second billing manager application 312, the second database application 316, the second user interface application 318, the first billing manager application 308, the first database application 314, the first user interface application 310, and the working group application 320.

The impact type 604 column includes rows that specify whether the impact for a corresponding application is code, support, or test. For example, the impact type 604 for the second billing manager application 312 is listed as code because the impact of developing and maintaining the second billing manager application 312 is developing application code. As another example, the impact type 604 for the second user interface application 318 is listed as support because the impact of developing and maintaining the second user interface application 318 is supporting another application, such as the second database application 316. As yet another example, the impact type 604 for the working group application 320 is listed as test because the impact of developing and maintaining the working group application 320 is testing other applications, such as the second billing manager application 312.

The disposition 604 column includes rows that specify whether a corresponding application is adopted or phased-out by a specific project. For example, the disposition 606 of the second billing manager application 312 is phased-out. In another example, the disposition 606 of the first database application 314 is adopted.

The working group support 608 column includes rows that specify whether a corresponding application is supported by the working group application 320 for a specific project, or not supported by the working group application 320 for the specific project. For example, the working group application 320 for the first project 302 supports the first billing manager application 308, but does not support the first database application 314. Because the first database application 314 is listed with the disposition 606 of adopted and the working group support 608 of no, another project supports the first database application 314.

The hours 610 column includes rows that specify the hours spent on a corresponding application, either during a baseline time period or during a subsequent time period. For example, the project table 600 indicates 100 hours spent on the second billing manager application 312 during January of the previous year and 150 hours spent on the first billing manager application 308 during January of the previous year. Calculations based on the data in the project table 600 enable a synergy tracker to estimate project hours spent by an adopted application in support of a phased-out application.

Turning now to FIG. 7, an illustrative hours estimation table 700 for a development and maintenance synergy tracker is depicted according to an embodiment of the present disclosure. The hours estimation table 700 provides the user of a synergy tracker with an overview of the calculations to estimate project hours spent by an adopted application in support of a phased-out application, a possible result of executing box 502 or box 504 in FIG. 5. The hours estimation table 700 includes columns for project 702, phased-out application 704, phased-out code hours 706, project hours 708, working group hours 710, phased-out hours percentage 712, and estimated adopted application support hours 714. The project 702 column lists a specific project, such as the first project 302. The phased-out application 704 column lists an application that was not adopted for the specific project, such as the second billing manager application 312.

The phased-out code hours 706 column lists the hours spent on the phased-out application, either during a baseline time period or during a subsequent time period. For example, the hours 610 in FIG. 6 specifies 100 as the number of hours spent on the second billing manager application 312 during January of the previous year. Therefore, in FIG. 7 the phased-out code hours 706 lists 100 as the hours spent on the second billing manager application 312 during January of the previous year.

The project code hours 708 column lists the code hours spent by on all applications adopted by the specific project and all applications that impact the specific project, either during a baseline time period or during a subsequent time period. For example, the hours 610 in FIG. 6 specifies 100 as the number of hours spent on the second billing manager application 312, 50 as the number of hours spent on the second database application 316, and 150 as the number of hours spent on the first billing manager application 308. The project code hours 708 totals only the hours spent on applications that impact code and are supported by the working group for the specific project, because these hours are the basis for estimating the hours the working group application 320 spends supporting supported applications. Therefore, in FIG. 7 the project code hours 708 lists 300 (100+50+150=300) as the project code hours spent on all applications during January of the previous year. The project code hours 708 does not include hours spent on applications that do not have the impact type 604 of support or test, such as the second user interface application 318, which has the impact type 604 of support. In this example, the working group application 320 tests only applications that have the impact type 604 of code. Additionally, the project code hours 708 does not include hours spent on applications that do not have the working group support 608 of yes, such as the first database application 314, which has the working group support 608 of no.

The working group hours 710 column lists the hours spent by the working group application 320 supporting all applications that impact code. For example, the hours 610 in FIG. 6 specifies 75 as the number of hours spent on the working group application 320. Therefore, in FIG. 7 the working group hours 710 lists 75 as the hours spent by the working group application 320 supporting all applications that impact code.

The phased-out hours percentage 712 column lists the estimated percentage of hours spent by the working group application 320 supporting a phased-out application, such as the second billing manager application 312. For example, the phased-out code hours 706 lists 100 as the hours spent on the second billing manager application and the project code hours 708 lists 300 as the hours spent on all supported applications that impact code. Therefore, the phased-out hours percentage 712 lists 33.3% (100/300=33.3%) as the estimated percentage of the hours spent by the working group application 320 supporting the second billing manager application 312 out of the hours spent by the working group application 320 supporting all applications that impact code.

The estimated adopted application support hours 714 column lists the estimated hours spent by an adopted application, such as the working group application 320, supporting a phased-out application, such as the second billing manager application 312. For example, by multiplying the phased-out hours percentage 712 of 33.3% by the working group hours 710 of 75, the synergy tracker estimates that the working group application 320 spent 25 hours (33.3%×75=25) testing, or supporting, the second billing manager application 312 during January of the previous year.

Turning now to FIG. 8, an illustrative phased-out application table 800 for a development and maintenance synergy tracker is depicted according to an embodiment of the present disclosure. The phased-out application table 800 provides the user of a synergy tracker with an overview of a phased-out application and its impacted projects. The phased-out application table 800 can enable a user to understand the basis for executing box 506 in FIG. 5. The phased-out application table 800 includes columns for projects 802, phased-out application 804, estimated hours to phased-out application 806, and estimated future hours to phased-out application 808. The projects 802 column lists the projects impacted by a specific phased-out application, such as the first project 402 and the fourth project 810. The phased-out application 804 column lists an application that was not adopted, such as the second billing manager application 312.

The estimated hours to phased-out application 806 column lists an estimated number of hours spent supporting a specific phased-out application, either during a baseline time period or during a subsequent time period. The estimated hours to phased-out application 806 is depicted for one time period for the purpose of an illustrative example only, as the phased-out application table 800 can include estimated hours to phased-out application 806 for any number of time periods. For one example, FIG. 7 lists 25 hours as the estimated adopted application support hours 714 during January of the previous year for the second billing manager application 312. Therefore, the estimated hours to phased-out application 806 lists 25 as the estimated hours that the working group application 320 supporting the first project 302 supported the second billing manager application 312.

The estimated future hours to phased-out application 808 column lists an estimated number of future hours supporting a specific phased-out application. The estimated future hours to phased-out application 808 is depicted for one time period for the purpose of an illustrative example only, as the phased-out application table 800 can include estimated future hours to phased-out application 808 for any number of time periods. In some embodiments, estimated future hours are calculated based on hours spent by a specific project supporting a specific phased-out application, either during a baseline time period or during a subsequent time period, possibly using a spreading algorithm to distribute the estimate of future hours over individual future periods of time, such as months. Alternatively, in other embodiments the estimated future hours are calculated based on forecasts made by project managers and the same calculations used to estimate hours during a baseline time period or during a subsequent time period. For example, FIG. 7 lists 25 hours as the estimated adopted application support hours 714 for the second billing manager application 312 during January of the previous year. Therefore, the estimated future hours to phased-out application 808 lists 25 as the estimated future hours that the working group application 320 supporting the first project 302 supports the second billing manager application 312 during a future time period, such as a later month of the current year. Alternatively, in some embodiments lower forecasts made by project managers are used with the same calculations used to estimate hours during a baseline time period or during a subsequent time period. The result of such calculations are the estimated future hours to phased-out application 808 listing 20 as the estimated future hours that the working group application 320 supporting the first project 302 supports the second billing manager application 312 during a future time period, such as February of the current year.

The phased-out application table 800 can also include a row for the fourth project 810, another project besides the first project 302 that is impacted by the second billing manager application 312. In some embodiments, the total indirect synergy for a phased-out application is estimated by combining the hours from the estimated hours to phased-out application 806 for each impacted project. For example, the total indirect synergy for the second billing manager application 312 is 45 hours, based on combining the estimates of 25 hours and 20 hours for each impacted project, the first project 302 and the fourth project 810.

Turning now to FIG. 9, an illustrative indirect synergy table 900 for a development and maintenance synergy tracker is depicted according to an embodiment of the present disclosure. The indirect synergy table 900 provides the user of a synergy tracker with an overview of the indirect synergy estimated for an adopted application in support of a phased-out application, a result of executing box 506 in FIG. 5. The indirect synergy table 900 includes columns for category 902, adopted application 904, phased-out application 906, estimated hours 908, and estimated future hours 910. The category 902 column includes rows for comparing time periods, such as baseline 912, subsequent 914, and delta 916. The baseline 912 row includes data for a baseline time period, such as a previous year. The subsequent 912 row includes data for a subsequent time period, such as a current year. The delta 916 row includes a comparison of the data in the baseline 912 row and the subsequent 914 row.

The adopted application 904 includes rows listing an adopted application, such as the working group application 320. The phased-out application 906 column includes rows listing a phased-out application, such as the second billing manager application 312.

The estimated hours 908 column includes rows listing estimated hours that an adopted application supported a phased-out application. The estimated hours 908 is depicted for one time period for the purpose of an illustrative example only, as the indirect synergy table 900 includes estimated hours 908 for any number of time periods. For one example, the baseline 912 row lists 22 as the estimated hours 908 that the working group application 320 supported the second billing manager application 312 during January of the previous year. As another example, the subsequent 914 row lists 25 as the estimated hours 908 that the working group application 320 supported the second billing manager application 312 during January of the current year.

Continuing these examples, the delta 912 row lists positive 3 as the change in estimated hours 908 that the working group application 320 supported the second billing manager application 312 during January of the current year in comparison to January of the previous year. Therefore, the working group application 320 spent an estimated 3 additional hours supporting the second billing manager application 312 during January of the current year in comparison to January of the previous year, which means no indirect synergy savings resulted for this adopted application supporting this phased-out application for January of the current year. Instead of realizing an indirect synergy savings result, additional hours may have been spent during January of the current year in preparation for phasing out the second billing manager application 312, resulting in an indirect synergy loss of 3 hours.

The estimated future hours 910 column includes rows listing estimated future hours that an adopted application supports a phased-out application. The estimated future hours 910 is depicted for one time period for the purpose of an illustrative example only, as the indirect synergy table 900 can include estimated future hours 910 for any number of time periods. In some embodiments, a synergy tracker estimates future hours for future time periods, such as the months of the current year after the current month, or even future months of future years. In another example, a synergy tracker estimates hours for the months of January of the previous year through January of the current year, the current month, based on recorded data.

For example, the baseline 912 row lists 24 as the estimated hours 908 that the working group application 420 supported the second billing manager application 312 during the month of February of the previous year. To estimate hours for February of the current year during January of the current year, a synergy tracker estimates future hours. For example, the subsequent 914 row lists 20 as the estimated hours 908 that the working group application 320 supports the second billing manager application 312 during February of the current year, an estimate made based on project manager forecasts made during January of the current year.

Continuing these examples, the delta 912 row lists negative 4 as the estimated hours 908 that the working group application 320 supports the second billing manager application 312 during February of the current year in comparison to February of the previous year. Therefore, the working group application 320 is estimated to spend 4 fewer hours supporting the second billing manager application 312 during February of the current year in comparison to February of the previous year. The indirect synergy savings for this adopted application to support this phased-out application for February of this year offsets the estimated indirect synergy loss of 3 hours for January of this year. After estimating the indirect synergy results, as displayed in the delta 916 row, the synergy tracker adds the indirect synergy results to the direct synergy results to create the combined synergy results, as described in box 510.

While several embodiments have been provided in the present disclosure, it should be understood that the disclosed systems and methods may be embodied in many other specific forms without departing from the spirit or scope of the present disclosure. Although projects were the focus of the discussion, other redundant systems, resources, and applications may be analyzed in a similar fashion. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

What is claimed is:

1. A computer implemented method for estimating a combined synergy result in a development process, comprising:
    estimating, by a synergy tracker stored on a non-transitory computer readable medium and executed by a processor, baseline project hours spent during a baseline time period by an adopted software application in support of a non-adopted software application, wherein the non-adopted software application is a redundant application under development that has been selected for phasing out, and wherein the estimated baseline project hours spent by the adopted software application in support of the non-adopted software application equals project hours spent on the adopted software application during the baseline time period multiplied by project hours spent on the non-adopted software application during the baseline time period and divided by project hours spent on all supported project software applications in the development process during the baseline time period;

estimating, by the synergy tracker, subsequent project hours spent during a subsequent time period by the adopted software application in support of the non-adopted software application, wherein the estimated subsequent project hours spent by the adopted software application in support of the non-adopted software application equals project hours spent on the adopted software application during the subsequent time period multiplied by project hours spent on the non-adopted software application during the subsequent time period and divided by project hours spent on all supported project software applications in the development process during the subsequent time period;

subtracting, by the synergy tracker, the estimated subsequent project hours from the estimated baseline project hours to determine an indirect synergy result, wherein the indirect synergy result illustrates hidden maintenance savings beyond development savings from phasing out the non-adopted application;

subtracting, by the synergy tracker, project hours spent in the subsequent time period on the non-adopted software application from project hours spent in the baseline time period on the non-adopted software application to determine a direct synergy result, wherein the direct synergy result illustrates the development savings from phasing out the non-adopted application; and adding, by the synergy tracker, the direct synergy result to the indirect synergy result to estimate the combined synergy result as hours saved to display on a computer.

2. The computer implemented method of claim 1 further comprising determining the combined synergy result as hours saved for each project impacted by the non-adopted software application in the development process.

3. The computer implemented method of claim 1 further comprising determining the combined synergy result as hours saved for each adopted software application that supports at least one non-adopted software application in the development process.

4. The computer implemented method of claim 1 further comprising determining the combined synergy result as hours saved in relation to each non-adopted software application in the development process.

5. The computer implemented method of claim 4 further comprising determining the combined synergy result as hours saved for each director of at least one non-adopted software application in the development process.

6. The computer implemented method of claim 1 further comprising converting the combined synergy result from hours saved to money saved.

7. A computer implemented system for estimating a combined synergy result in a development process, comprising:
a data manager stored on a non-transitory computer readable medium and executable by a processor to:
estimate baseline project hours spent during a baseline time period by an adopted software application in support of a non-adopted software application, wherein the non-adopted software application is a redundant application under development that has been selected for phasing out, and wherein the estimated baseline project hours spent by the adopted software application in support of the non-adopted software application equals project hours spent on the adopted software application during the baseline time period multiplied by project hours spent on the non-adopted software application during the baseline time period and divided by project hours spent on all supported project software applications in the development process during the baseline time period;

estimate subsequent project hours spent during a subsequent time period by the adopted software application in support of the non-adopted software application, wherein the estimated subsequent project hours spent by the adopted software application in support of the non-adopted software application equals project hours spent on the adopted software application during the subsequent time period multiplied by project hours spent on the non-adopted software application during the subsequent time period and divided by project hours spent on all supported project software applications in the development process during the subsequent time period;

subtract the estimated subsequent project hours from the estimated baseline project hours to determine an indirect synergy result, wherein the indirect synergy result illustrates hidden maintenance savings beyond development savings from phasing out the non-adopted application;

subtract hours spent in the subsequent time period on the non-adopted software application from hours spent in the baseline time period on the non-adopted software application to determine a direct synergy result, wherein the direct synergy result illustrates the development savings from phasing out the non-adopted application; and add the direct synergy result to the indirect synergy result to estimate a combined synergy result as hours saved to store in the memory.

8. The computer implemented system of claim 7 wherein the data manager is further operable to determine the combined synergy result as hours saved for each project impacted by the non-adopted software application in the development process.

9. The computer implemented system of claim 7 wherein the data manager is further operable to determine the combined synergy result as hours saved for each adopted software application that supports at least one non-adopted software application in the development process.

10. The computer implemented system of claim 7 wherein the data manager is further operable to determine the combined synergy result as hours saved in relation to each non-adopted software application in the development process.

11. The computer implemented system of claim 10 wherein the data manager is further operable to determine the combined synergy result as hours saved for each director of at least one non-adopted software application in the development process.

12. The computer implemented system of claim 11 wherein the data manager is further operable to determine the combined synergy result as hours saved for each executive supervising each director of at least one non-adopted software application in the development process.

13. A computer implemented method estimating a future combined synergy result in a development process, comprising:
estimating, by a synergy tracker stored on a non-transitory computer readable medium and executed by a processor, baseline project hours spent during a baseline time period by an adopted software application in support of a non-adopted software application, wherein the non-adopted software application is a redundant application under development that has been selected for phasing out, and wherein the estimated baseline project hours spent by the adopted software application in support of the non-adopted software application equals project hours spent on the adopted software application during the baseline time period multiplied by project hours spent on the non-adopted software application during the baseline time period and divided by project hours spent on all supported project software applications in the development process during the baseline time period;

estimating, by the synergy tracker, future project hours to be spent during a subsequent time period by the adopted software application in support of the non-adopted software application, wherein the estimated subsequent project hours spent by the adopted software application in support of the non-adopted software application equals project hours spent on the adopted software application during the subsequent time period multiplied by project hours spent on the non-adopted software application during the subsequent time period and divided by project hours spent on all supported project software applications in the development process during the subsequent time period;

subtracting, by the synergy tracker, the estimated future project hours from the estimated baseline project hours to determine a future indirect synergy result, wherein the indirect synergy result illustrates hidden maintenance savings beyond development savings from phasing out the non-adopted application;

subtracting, by the synergy tracker, estimated future hours to be spent during the subsequent time period on the non-adopted software application from hours spent during the baseline time period on the non-adopted software application to determine a future direct synergy result, wherein the direct synergy result illustrates the development savings from phasing out the non-adopted application; and adding, by the synergy tracker, the future direct synergy result to the future indirect synergy result to create a future combined synergy result as hours saved to display on a computer.

14. The computer implemented method of claim 13 further comprising determining the future combined synergy result as hours saved for each of a plurality of projects impacted by the non-adopted software application in the development process.

15. The computer implemented method of claim 13 further comprising determining the future combined synergy result as hours saved for each adopted software application that supports at least one non-adopted software application in the development process.

16. The computer implemented method of claim 13 further comprising determining the future combined synergy result as hours saved in relation to each of a plurality of non-adopted software applications in the development process.

17. The computer implemented method of claim 16 further comprising determining the future combined synergy result as hours saved for each director of at least one non-adopted software application in the development process.

* * * * *